US008179892B2

(12) United States Patent  (10) Patent No.: US 8,179,892 B2
Chambers  (45) Date of Patent: May 15, 2012

(54) SYSTEM AND METHOD FOR MANAGING COMMUNICATION LINKS

(75) Inventor: Christopher Alan Chambers, Stanton, CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

(21) Appl. No.: 12/632,895

(22) Filed: Dec. 8, 2009

(65) Prior Publication Data

US 2010/0138563 A1 Jun. 3, 2010

Related U.S. Application Data

(62) Division of application No. 11/502,780, filed on Aug. 11, 2006, which is a division of application No. 10/431,930, filed on May 8, 2003, now Pat. No. 7,167,913.

(60) Provisional application No. 60/386,301, filed on Jun. 5, 2002.

(51) Int. Cl.
    *H04L 12/28* (2006.01)
(52) U.S. Cl. ............ 370/390; 370/280; 370/449
(58) Field of Classification Search ............. 370/280, 370/390, 449
    See application file for complete search history.

(56) References Cited

U.S. PATENT DOCUMENTS

| 4,213,119 | A |   | 7/1980  | Ward et al. |
| 4,231,031 | A |   | 10/1980 | Crowther et al. |
| 4,377,006 | A |   | 3/1983  | Collins et al. |
| 4,456,793 | A |   | 6/1984  | Baker et al. |
| 4,768,207 | A |   | 8/1988  | Sejourne et al. |
| 4,980,886 | A |   | 12/1990 | Bernstein |
| 4,998,244 | A | * | 3/1991  | Lee et al. ............... 370/439 |
| 5,274,841 | A | * | 12/1993 | Natarajan et al. ........ 370/337 |
| 5,313,199 | A |   | 5/1994  | Kwon |
| 5,668,803 | A |   | 9/1997  | Tymes et al. |
| 5,684,871 | A |   | 11/1997 | Devon et al. |
| 5,687,175 | A | * | 11/1997 | Rochester et al. ........ 370/449 |
| 5,734,833 | A |   | 3/1998  | Chiu et al. |
| 5,737,330 | A | * | 4/1998  | Fulthorp et al. ......... 370/346 |
| 5,772,963 | A | * | 6/1998  | Cantatore et al. ......... 422/67 |
| 5,818,617 | A |   | 10/1998 | Shipley |
| 5,818,823 | A |   | 10/1998 | Nakanishi |
| 5,844,942 | A |   | 12/1998 | Hicks et al. |
| 5,850,400 | A |   | 12/1998 | Eames et al. |

(Continued)

FOREIGN PATENT DOCUMENTS

EP 0506457 A2 9/1992

(Continued)

OTHER PUBLICATIONS

IEEE Standards, Part 15.3: Wireless Medium Access Control (MAC) and Physical Layer (PHY) Specifications for High Rate Wireless Personal Area Networks (WPANs), Sep. 29, 2003, New York.

*Primary Examiner* — Derrick Ferris
*Assistant Examiner* — Christopher R Crompton
(74) *Attorney, Agent, or Firm* — Greenberg Traurig, LLP

(57) ABSTRACT

A system and method for managing a communication link between a consumer electronic device adapted for two-way, wireless communications with at least one peripheral. The communication link is managed using a controller that is associated with the consumer electronic device that functions to assign communication slots to the peripheral to facilitate communications between the peripheral and the consumer electronic device.

2 Claims, 11 Drawing Sheets

TWO PERIPHERAL DEVICES REGISTER AND TRANSFER MULTIPLE DATA PACKETS

U.S. PATENT DOCUMENTS

| | | |
|---|---|---|
| 5,970,062 A | 10/1999 | Bauchot |
| 6,108,376 A | 8/2000 | Morgan et al. |
| 6,122,516 A | 9/2000 | Thompson et al. |
| 6,160,801 A | 12/2000 | Barrett |
| 6,198,728 B1 | 3/2001 | Hulyalkar et al. |
| 6,198,766 B1 | 3/2001 | Schuppe et al. |
| 6,212,230 B1 | 4/2001 | Rybicki et al. |
| 6,307,862 B1 | 10/2001 | Silverman |
| 6,333,916 B1 | 12/2001 | Hamada et al. |
| 6,333,923 B1 | 12/2001 | Maki et al. |
| 6,393,064 B1 | 5/2002 | Nagai et al. |
| 6,597,683 B1 | 7/2003 | Gehring et al. |
| 6,599,194 B1 | 7/2003 | Smith et al. |
| 6,693,879 B1 | 2/2004 | Kawamura et al. |
| 6,711,177 B1 | 3/2004 | Young |
| 6,714,801 B1 | 3/2004 | Sugaya |
| 6,754,190 B2 | 6/2004 | Gurney et al. |
| 6,781,967 B1 | 8/2004 | Young |
| 6,781,978 B1 | 8/2004 | Xie et al. |
| 7,292,628 B2 | 11/2007 | Koerner et al. |
| 7,586,949 B1 | 9/2009 | Barany et al. |
| 2002/0057661 A1* | 5/2002 | Raith ............................ 370/337 |
| 2002/0159434 A1 | 10/2002 | Gosior et al. |
| 2002/0159544 A1 | 10/2002 | Karaoguz |
| 2003/0035173 A1 | 2/2003 | Byers et al. |
| 2003/0054818 A1* | 3/2003 | Bahl et al. ..................... 455/432 |
| 2003/0112878 A1 | 6/2003 | Kloper |
| 2003/0115369 A1* | 6/2003 | Walter et al. .................. 709/253 |

FOREIGN PATENT DOCUMENTS

| | | |
|---|---|---|
| EP | 0952689 A2 | 10/1999 |
| EP | 1079550 A1 | 2/2001 |
| GB | 2314745 A | 1/1998 |
| GB | 2345213 A | 6/2000 |
| WO | WO 83/04462 | 12/1983 |
| WO | WO 96/37982 | 11/1996 |
| WO | WO 98/00932 | 1/1998 |

* cited by examiner

ONE DEVICE REGISTERS AND SENDS SINGLE DATA PACKET

ONE DEVICE REGISTERS AND SENDS MULTIPLE DATA PACKETS

OUTBOUND LINK MANAGEMENT PACKET GENERAL FORMAT

|   | 5 | 4 | 3 | 2 | 1 | 0 |
|---|---|---|---|---|---|---|
| 0 | X | X | X | X | X | X |
| 1 | M1 | M0 | D21 | D20 | D19 | D18 |
| 2 | D17 | D16 | D15 | D14 | D13 | D12 |
| 3 | D11 | D10 | D9 | D8 | D7 | D6 |
| 4 | D5 | D4 | D3 | D2 | D1 | D0 |

M1-M0          PROTOCAL OPERATION MODE
     0 = STANDARD OPERATION, 1-3 TBD
D21-D0          PROTOCAL OPERATION MODE SPECIFIC DATA
X    PROTOCOL BIT

THE DATA PULSES OF AN OUTBOUND PROTOCOL SYNCHRONIZTION PACKET MAY CONTAIN THIRTY BITS OF PROTOCOL DATA ENCODED USING PULSE POSITION MODULATION (PPM).

FIG. 5

CYCLE COMPLETION PACKET (PROTOCOL OPERATION MODE=0)

|   | 5 | 4 | 3 | 2 | 1 | 0 |
|---|---|---|---|---|---|---|
| 0 | X | X | X | X | X | X |
| 1 | 0 | 0 | S0.3 | S0.2 | S0.1 | S0.0 |
| 2 | T5 | T4 | S1.3 | S1.2 | S1.1 | S1.0 |
| 3 | T3 | T2 | S2.3 | S2.2 | S2.1 | S2.0 |
| 4 | T1 | T0 | S3.3 | S3.2 | S3.1 | S3.0 |

S(n)3-S(n)0    STATE OF SLOT (n)
T5-T0          TAG[1] (0=UNUSED)
X              PROTOCOL BIT

1. IF ANY SLOT HAS A STATE OF 3 (REGISTERED, TAG ASSIGNMENT), THEN THIS VALUE MAY BE USED AS THE ASSIGNED TAG. IF ANY SLOT HAS A STATE OF 12 (POLLED INBOUND LONG PERIPHERAL PACKET) OR 13 (POLLED INBOUND SHORT PERIPHERAL PACKET) THEN THIS VALUE MAY REPRESENT THE TAG OF THE PERIPHERAL THAT IS BEING POLLED FOR IN THE FIRST SUCH SLOT. EACH SUCCESSIVE POLLED SLOT WOULD HAVE THE POLLED TAG VALUE INCREMENTED BY 1.

FIG. 6

GENERAL LONG PACKET FORMAT (42 BITS, 32 BITS OF PAYLOAD):

|   | 5 | 4 | 3 | 2 | 1 | 0 |
|---|---|---|---|---|---|---|
| 0 | X | X | X | X | X | X |
| 1 | X | P1 | P2 | D32 | D31 | D30 |
| 2 | D29 | D28 | D27 | D26 | D25 | D24 |
| 3 | D23 | D22 | D21 | D20 | D19 | D18 |
| 4 | D17 | D16 | D15 | D14 | D13 | D12 |
| 5 | D11 | D10 | D9 | D8 | D7 | D6 |
| 6 | D5 | D4 | D3 | D2 | D1 | D0 |

P1-P0        PACKET TYPE
0 = INBOUND, PERIPHERAL PACKET
1 = INBOUND, BINARY DATA
2 = OUTBOUND, BINARY DATA
3 = TBD
D32-D0        PACKET TYPE SPECIFIC DATA
X     PROTOCOL BIT

THE DATA PULSES OF AN INBOUND/OUTBOUND LONG SLOT PACKET MAY CONTAIN
FORTY-TWO BITS OF PROTOCOL DATA ENCODED USING PULSE POSITION MODULATION (PPM).

FIG. 7

GENERAL PERIPHERAL PACKET FORMAT:

|   | 5 | 4 | 3 | 2 | 1 | 0 |
|---|---|---|---|---|---|---|
| 0 | X | X | X | X | X | X |
| 1 | X | 0 | 0 | A3 | A2 | A1 |
| 2 | REG | D28 | D27 | D26 | D25 | D24 |
| 3 | D23 | D22 | D21 | D20 | D19 | D18 |
| 4 | D17 | D16 | D15 | D14 | D13 | D12 |
| 5 | D11 | D10 | D9 | D8 | D7 | D6 |
| 6 | D5 | D4 | D3 | D2 | D1 | D0 |

A(n) ACK FOR SLOT [(<#[1]>+n) %4], (1 = ACK, 0 = NA[2])
REG REGISTRY (1 = PERIPHERAL REGISTRY, 0 = PERIPHERAL DATA)
D28-D0                PERIPHERAL PACKET DATA
X    PROTOCOL BIT

1. THE CURRECT SLOT THAT THIS PACKET IS BEING TRANSMITTED IN. SLOTS ARE NUMBERED 0 TO 3. THIS MAY BE USED TO ACKNOWLEDGE RECEPTION OF OUTBOUND BINARY DATA IN THE SPECIFIED SLOT.

2. NOT APPLICABLE, OR NO OPINION.

FIG. 8

PERIPHERAL REGISTRY (STANDARD)

|   | 5 | 4 | 3 | 2 | 1 | 0 |
|---|---|---|---|---|---|---|
| 0 | X | X | X | X | X | X |
| 1 | X | 0 | 0 | A3 | A2 | A1 |
| 2 | 1 | X | PRG | T5 | T4 | T3 |
| 3 | T2 | T1 | T0 | R20 | R19 | R18 |
| 4 | R17 | R16 | R15 | R14 | R13 | R12 |
| 5 | R11 | R10 | R9 | R8 | R7 | R6 |
| 6 | R5 | R4 | R3 | R2 | R1 | R0 |

A(n) ACK FOR SLOT [(<#>+n) %4], (1 = ACK, 0 = NA)
PRG PERSISTENT REGISTRATION (1 = YES, 0 = NO)
T5-T0                   TAG (0 = NO TAG. REQUEST ASSIGNMENT)
R20-R0                 REGISTRY NUMBER
X     PROTOCOL BIT

FIG. 9

PERIPHERAL DATA PACKET FORMAT:

|   | 5 | 4 | 3 | 2 | 1 | 0 |
|---|---|---|---|---|---|---|
| 0 | X | X | X | X | X | X |
| 1 | X | 0 | 0 | A3 | A2 | A1 |
| 2 | 0 | D28 | D27 | D26 | D25 | D24 |
| 3 | D23 | D22 | D21 | D20 | D19 | D18 |
| 4 | D17 | D16 | D15 | D14 | D13 | D12 |
| 5 | D11 | D10 | D9 | D8 | D7 | D6 |
| 6 | D5 | D4 | D3 | D2 | D1 | D0 |

A(n) ACK FOR SLOT [(<#>+n) %4], (1 = ACK, 0 = NA)
D28-D0           PERIPHERAL PACKET DATA

FIG. 10A

INBOUND BINARY DATA PACKET FORMAT:

|   | 5 | 4 | 3 | 2 | 1 | 0 |
|---|---|---|---|---|---|---|
| 0 | X | X | X | X | X | X |
| 1 | X | 0 | 1 | A | D31 | D30 |
| 2 | D29 | D28 | D27 | D26 | D25 | D24 |
| 3 | D23 | D22 | D21 | D20 | D19 | D18 |
| 4 | D17 | D16 | D15 | D14 | D13 | D12 |
| 5 | D11 | D10 | D9 | D8 | D7 | D6 |
| 6 | D5 | D4 | D3 | D2 | D1 | D0 |

A    ACKNOWLEDGE OUTBOUND BINARY DATA[1] (1 = ACK, 0 = NA)
Dx   BINARY DATA PAYLOAD

1. THIS ALLOWS FOR ACKNOWLEDGING ALL OUTBOUND BINARY DATA PACKETS THAT ARE EITHER EXPLICITLY OR IMPLICITLY ADDRESSED TO THIS PERIPHERAL OR SLOT. SINCE THIS IS ONLY A SINGLE BIT, ALL SUCH PACKETS SHOULD HAVE BEEN PROPERLY RECEIVED IN ORDER TO ISSUE AN ACK.

FIG. 10B

SHORT PERIPHERAL DATA PACKET FORMAT

|   | 5 | 4 | 3 | 2 | 1 | 0 |
|---|---|---|---|---|---|---|
| 0 | X | X | X | X | X | X |
| 1 | X | A | D15 | D14 | D13 | D12 |
| 2 | D11 | D10 | D9 | D8 | D7 | D6 |
| 3 | D5 | D4 | D3 | D2 | D1 | D0 |

A     ACKNOWLEGE OUTBOUND BINARY DATA[1] (1=ACK, 0=NA[2])
D15-D0            PERIPHERAL PACKET DATA.

1. THIS ALLOWS FOR ACKNOWLEDGING ALL OUTBOUND BINARY DATA PACKETS THAT ARE EITHER EXPLICITLY OF IMPLICITLY ADDRESSED TO THIS PERIPHERAL OR SLOT. SINCDE THIS IS ONLY A SINGLE BIT, ALL SUCH PACKETS SHOULD HAVE BEEN PROPERLY RECEIVED IN ORDER TO ISSUE AN ACK.

2. NOT APPLICABLE, OR NO OPINION.

FIG. 10C

GENERAL OUTBOUND BINARY DATA PACKET FORMAT:

|   | 5 | 4 | 3 | 2 | 1 | 0 |
|---|---|---|---|---|---|---|
| 0 | X | X | X | X | X | X |
| 1 | X | 1 | 0 | AR | D31 | D30 |
| 2 | D29 | D28 | D27 | D26 | D25 | D24 |
| 3 | D23 | D22 | D21 | D20 | D19 | D18 |
| 4 | D17 | D16 | D15 | D14 | D13 | D12 |
| 5 | D11 | D10 | D9 | D8 | D7 | D6 |
| 6 | D5 | D4 | D3 | D2 | D1 | D0 |

AR   ACKNOWLEDGEMENT REQUIRED[1] (1 = YES, 0 = NO)
Dx   BINARY DATA PAYLOAD
X   PROTOCOL BIT

1. IF ACKNOWLEDGEMENT IS REQUIRED THEN THEN TS SHOULD CONTINUE TO RETRANSMIT THE SAME OUTBOUND BINARY DATA PACKET UNTIL ALL OF THE RECIPIENT PERIPHERALS HAVE ACKNOWLEDGED THE PACKET.

FIG. 11

SYSTEM AND METHOD FOR MANAGING COMMUNICATION LINKS

RELATED APPLICATIONS

This application claims the benefit of and is a divisional of U.S. application Ser. No. 11/502,780, filed Aug. 11, 2006, which, in turn, claims the benefit of and is a divisional of U.S. application Ser. No. 10/431,930, filed May 8, 2003 which, in turn, claims the benefit of U.S. Application No. 60/386,301, filed on Jun. 5, 2002, which applications are hereby incorporated by reference in their entirety.

BACKGROUND

The following relates generally to communication links and, more particularly, relates to a system and method for managing communication links using a bi-directional communication protocol.

Bi-directional communication protocols are known in the art. For example, U.S. Pat. No. 5,564,020 described two units, one of which is installed in a computer and one of which is located remotely with respect to the computer, that communicate over an infrared (IR) link. Each unit has a serial number to identify itself and to keep a communication link secure once established. The IR link is established by hitting an initialization switch on each of the two units, at which time they commence transmitting their serial numbers and an acknowledgement process occurs. Once this initialization has occurred and both units have registered with the other unit, only communications from the proper serial number provider are accepted. After the initialization phase, data and commands are sent between the two units in a packetized structure which allows error checking as necessary.

By way of further example, U.S. Pat. No. 5,917,631 describes using a pulse position modulation (PPM) scheme, similar to that described by Garrett in U.S. Pat. No. 4,584,720, to establish a communication link between a remote control and a receiving unit. This PPM scheme uses the position of a single pulse, such as an IR pulse, to indicate a multi—bit value. For example, a sixteen or greater position PPM scheme may be used to encode four-bit hexadecimal data values. In this way, the single pulse may substitute for what otherwise would have been multiple pulses in a simple binary encoding scheme.

By way of still further example, U.S. Pat. No. 5,640,160 describes a PPM modulation protocol where a binary code is divided into 2-bit data units and pulse position modulation is performed on each unit rather than on each bit. In this manner, since a pulse is not formed for each bit, the transmission interval and transmission frame interval for the modulated signal is shortened, thus enabling high speed transmission. In addition, since the width of the pulse does not contain any transmission information, the pulse width is made as short as possible, thereby reducing battery consumption within the transmitter.

While such bi-directional communication protocols do work for their intended purpose, what is needed is an improved system and method for managing bi-directional communication links.

SUMMARY

In accordance with this need, a system and method is described wherein a consumer electronic device is adapted for two-way, wireless communications with at least one peripheral device. The consumer electronic device is further associated with a controller that functions to assign communication slots to the peripheral to facilitate communications between the peripheral and the consumer electronic device. Communications may be performed using a bi-directional IR protocol such as, for example, TWIRP 32X which transmits data using PPM modulation and a sub-carrier of 455 kHz.

A better understanding of the objects, advantages, features, properties and relationships of the subject system and method will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the system and method for managing communication links, reference may be had to preferred embodiments shown in the following drawings in which:

FIG. 5 illustrates an exemplary "Outbound Link Management" packet wherein fields that are associated with other protocol layers such as error detection, etc., and that are not involved in link management are omitted for the sake of clarity (e.g., indicated by a "X" protocol bit);

FIG. 6 illustrates an exemplary "End-of-Cycle" link management packet wherein fields that are associated with other protocol layers such as error detection, etc., and that are not involved in link management are omitted for the sake of clarity (e.g., indicated by a "X" protocol bit);

FIG. 7 illustrates an exemplary "General Long Packet" format wherein fields that are associated with other protocol layers such as error detection, etc., and that are not involved in link management are omitted for the sake of clarity (e.g., indicated by a "X" protocol bit);

FIG. 8 illustrates an exemplary "Peripheral Packet" format wherein fields that are associated with other protocol layers such as error detection, etc., and that are not involved in link management are omitted for the sake of clarity (e.g., indicated by a "X" protocol bit);

FIG. 9 illustrates an exemplary "Peripheral Registry" packet wherein fields that are associated with other protocol layers such as error detection, etc., and that are not involved in link management are omitted for the sake of clarity (e.g., indicated by a "X" protocol bit);

FIG. 10 illustrates an exemplary "Peripheral Data" packet wherein fields that are associated with other protocol layers such as error detection, etc., and that are not involved in link management are omitted for the sake of clarity (e.g., indicated by a "X" protocol bit); and FIG. 11 illustrates an exemplary "Outbound Binary Data" packet wherein fields that are associated with other protocol layers such as error detection, etc., and that are not involved in link management are omitted for the sake of clarity (e.g., indicated by a "X" protocol bit).

DETAILED DESCRIPTION

Figure 1:
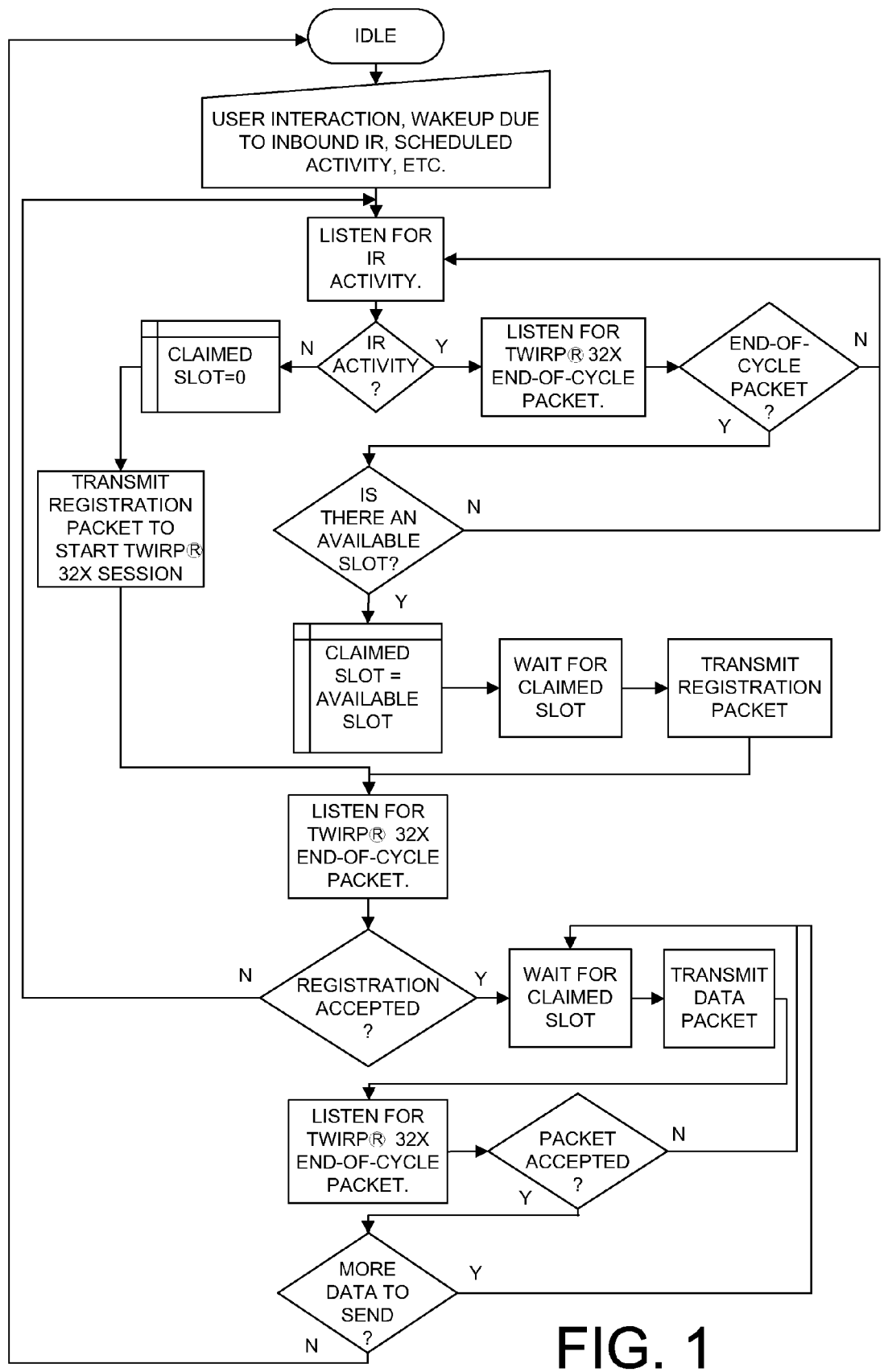
FIG. 1 illustrates, in flowchart form, an example of the overall logic flow followed by a peripheral in the acquisition of a time slot from a TS Controller and transfer of data using the registered slot.

With reference to the Figures, a system and method is described wherein a master station transceiver, hereafter referred to as a Time Slot Controller ("TS Controller"), directs and synchronizes the communications of a plurality of peripherals, e.g., up to sixty-three (63), sharing a communication link. In a preferred embodiment, the TS controller is associated with a consumer electronic device, e.g., a piece of home entertainment equipment, a game console, etc., and the peripherals comprise one or more controlling peripheral devices, e.g., a remote control, game controller, keyboard, etc., wherein the peripherals are adapted to transmit and/or receive communications, via the TS controller, with the consumer electronic device. As will be appreciated, the TS controller is associated with the consumer electronic device by being embedded within the consumer electronic device or by being distinct from the consumer electronic device but in further communication with the consumer electronic device, either via wired or wireless transmissions. In this manner, a one to many correspondence is created between the TS Controller/consumer electronic equipment and peripherals by which multiple peripherals can be used to command the operation of and/or receive feed back from a consumer electronic device.

To facilitate communication via the communication link, a given protocol cycle within the communication link may be divided into four (4) general-purpose time slots and one dedicated protocol control and synchronization time slot. Each of these four (4) general purpose time slots can accommodate a single inbound or outbound data packet and may be demarcated by a marker pulse transmitted by the TS controller. At different times a given protocol cycle might be used for dynamic inbound peripheral packets, inbound or outbound binary data packets, and/or polled inbound peripheral packets. Both long packets, e.g., forty-two (42) bits, and short packets, e.g., twenty-four (24) bits, may be supported. As described in more detail in the following sections, time slots are dynamically assigned and contended for by multiple peripherals under the supervision of the TS controller utilizing the aforementioned dedicated protocol control and synchronization time slot. In this manner, the dynamic assignment of time slots enables more peripheral devices to be used within the system than there are time slots available in a single protocol cycle, i.e., individual peripheral devices may successively register, obtain a time slot, transfer data, and then relinquish the time slot for use by other peripheral devices. Alternatively, individual peripheral devices may be polled by the TS controller in a cyclic fashion, responding in time slots indicated in each poll request. The length of each time slot may also be dynamically variable under the supervision of the TS controller such that multiple data packet sizes may be supported and empty (idle) slots occupy a minimum amount of time.

To allow for the sharing of the communication link, a slotted round robin scheme may be utilized. In this approach, either no packet or a single packet may be transferred during each time slot; either inbound to, or outbound from the TS Controller. Furthermore, individual time slots may operate in one of two modes at any given time, namely, dedicated half-duplex with any given peripheral device or sequential automatic polling for responses from a group of peripheral devices. Sharing of the communication link may be further facilitated by providing individual peripherals with an assigned, unique twenty one-bit (21-bit) registry number. This registry number may serve, for example, to define capabilities and functions of a peripheral device and/or identify to which application or driver software module within the TS controller or appliance the data received from a peripheral device is to be directed. The assignment of registry numbers is preferably maintained by a central registration authority.

In order to acquire a time slot and transmit data, a peripheral monitors the communication link for activity as illustrated in FIG. 1. If the communication link is active, the peripheral examines the "Outbound Link Management" packet(s) transmitted by the TS controller until an "End-of-Cycle" packet is detected. The peripheral then examines the data content of the "End-of-Cycle" packet to find a time slot which is idle as will be described further in conjunction with FIGS. 5 and 6.

Turning to FIG. 5, there is illustrated an exemplary general format for an "Outbound Link Management" packet. The "Outbound Link Management" packet may comprise 30 bits of information, which have been arranged in FIG. 5 as five 6-bit long words for ease of reference only. In particular, if the two Protocol Operation Mode bits M0 and M1 (illustrated in locations 1-4 and 1-5 in FIG. 5) are both zero, the packet is an "End-of-Cycle" packet and the payload data bits D0 thru D21 of FIG. 5 assume the significance illustrated in FIG. 6. Specifically, in the packet illustrated FIG. 6, the current state and availability of each of the four (4) general-purpose time slots may be indicated by a series of 4-bit data values S(n)3 through S(n)0 (where "n"=the slot number). The status of each slot can thus assume, by way of example, one of the 16 possible values set forth in Table 1.

TABLE 1

0  Idle/Available
1  ACK
2  Registered, Tag Accepted
3  Registered, Tag Assignment
   (e.g., the assigned tag is reported in T5-T0 and there is only one
   tag assignment in a given cycle)
4  NACK
5  NACK, Slot not Registered
6  Persistent Registration
7  BACKOFF
   (e.g., abandon the current protocol session and maintain IR silence
   until there has been at least 200 ms of continuous IR silence)
8  Outbound Data, Broadcast
9  Outbound Data, for device in Slot ((n + 1) % 4)
10 Outbound Data, for device in Slot ((n + 2) % 4)
11 Outbound Data, for device in Slot ((n + 3) % 4)
12 Polled inbound Long Peripheral Packet
13 Polled inbound Short Peripheral Packet
14 Reserved by the TS Controller
   (e.g., the TS Controller is reserving this slot for possible use in
   the future. This might be done in order to ensure slot availability
   if the TS knows that an outbound data transmission is about
   to be scheduled)
15 TBD The "End-of-Cycle" packet data may also include a tag assignment field (T5 through T0) the significance of which will be described later.

When a peripheral finds an available time slot, as indicated by a value of zero (0) in the S(n) field for that slot, the peripheral may transmit a "Peripheral Registry Request" packet to the TS controller in the next occurrence of that time slot. In the event that two peripheral devices simultaneously attempt to acquire the same slot, the TS controller should respond negatively (e.g., with a slot status of "4" or "5" as set forth in Table 1) to the corrupted data resulting from the collision between the multiple, received "Peripheral Registry Request" packets. Upon detection of such a negative response, each of the peripheral devices that transmitted the simultaneous messages in question should be programmed to back off, i.e., not transmit, fir a variable period of time determined, for example, as a function of a combination of their Registry Number and last assigned tag number. In the event that no IR activity is detected by a peripheral device for a period of time equal to or greater than the overall round robin protocol cycle time, the peripheral device may assume that no transactions are currently taking place and the TS controller has entered into an idle mode, in which case the peripheral device may simply assume ownership of slot zero and initiate activity by issuing an asynchronous "Peripheral Registry Request" for slot zero. Receipt of such a request by the TS Controller should result in the IS Controller exiting its idle state and recommencing protocol cycling.

A "Peripheral Registry" packet may be a special case of a more general long packet, e.g., forty-two (42) bit, packet type. Turning to FIG. 6, there is illustrated an exemplary general format for a long packet, arranged in FIG. 6 as seven 6-bit long words for ease of reference. In this example, bit locations 1-3 and 1-4 (e.g., P1 and P2) define the packet type: 0 or 1 for an inbound packet (i.e., from a peripheral device to the TS Controller), 2 for an outbound packet (i.e., from the TS Controller to one or more peripheral devices).

The data field assignments for inbound peripheral packets (i.e., P1,P2=0) are illustrated by way of example in FIG. 8. In particular, bit location 2-5 (e.g., REG) indicates whether this packet should be interpreted by the TS Controller as a "Peripheral Registry Request" packet or as a "Peripheral Data" packet. For example, if "REG"=1, the packet may be viewed as a "Peripheral Registry Request" packet with data field significance as illustrated in FIG. 9.

Referring to example illustrated in FIG. 9, the packet may comprise a 21-bit "Peripheral Registry Number" (e.g., R0 through R20) which identifies the peripheral device initiating the registration request and a 6-bit Tag Value (e.g., T0 through T5) to be used to uniquely identify the peripheral device throughout the forthcoming data exchange session for the duration of the registration of the peripheral device with the TS Controller. A preference as to the 6-bit tag value may be specified by the peripheral device as part of the "Peripheral Registry Request" packet or it may left to be assigned by the TS Controller. In either event, the actual tag value to be used for the duration of this session should be confirmed by the TS Controller and communicated back to the peripheral device as part of the "End-of-Cycle" data packet which is illustrated by way of example in FIG. 6. Finally, the "Peripheral Registration" packet may contain a 1-bit value (e.g., PRG) which is used to request that the registration be treated as persistent by the TS Controller in the manner described in greater detail hereinafter.

Upon receipt of such a "Peripheral Registration Request" packet, the TS controller may issue a "registration accepted" status for this slot in the next "End-of-Cycle" packet (i.e., in the S(n)3 through S(n)0 field previously described in connection with FIG. 6), including confirmation of the tag number to be used (i.e., in the T5 through T0 field). In the illustrated context it will be noted that, since only one T5-T0 Tag field is available in the "End-of-Cycle" packet, there may be only one registration acceptance and tag assignment in any given cycle.

While the previous description set forth the use of a forty-two (42) bit long packet type, it will be appreciated that it is also possible to support peripheral registration requests formatted as short packets (e.g., twenty-four (24) bit) if desired. In this case, an abbreviated peripheral registry number may be used where, for example, the first portion of the registry number, perhaps a type or category indicator, may be implied by the peripheral device's use of the short packet form.

Figure 2:
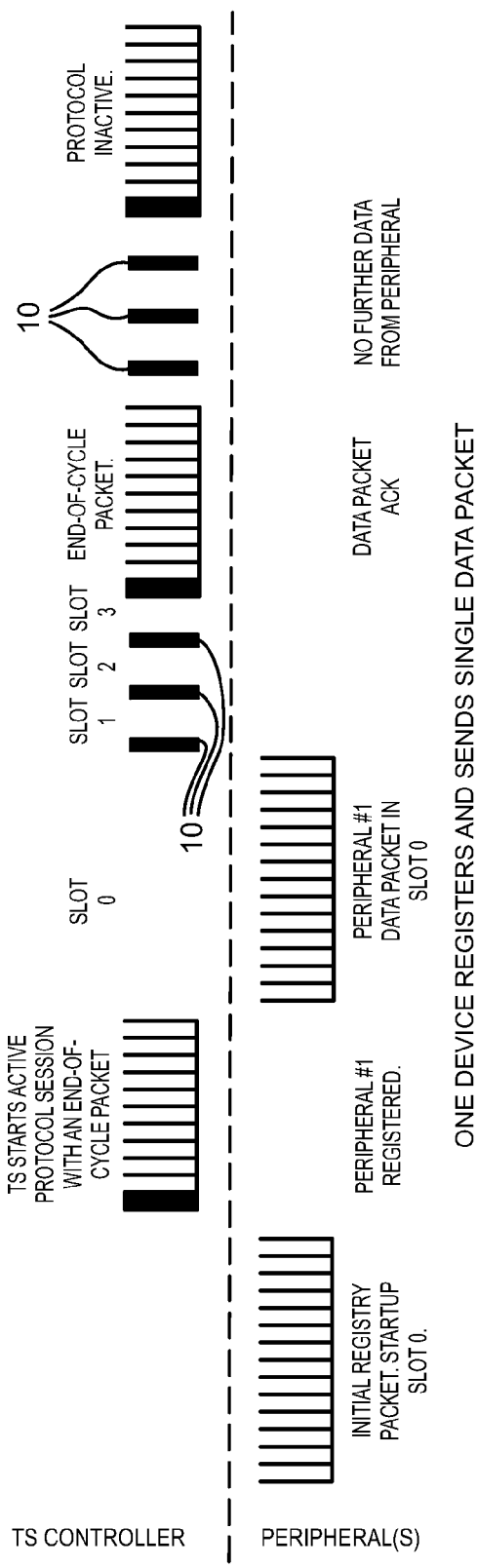
FIG. 2 illustrates, in graphical form, the sequential exchange of data packets between the TS Controller and a single peripheral transferring a single packet of data.
Figure 3:
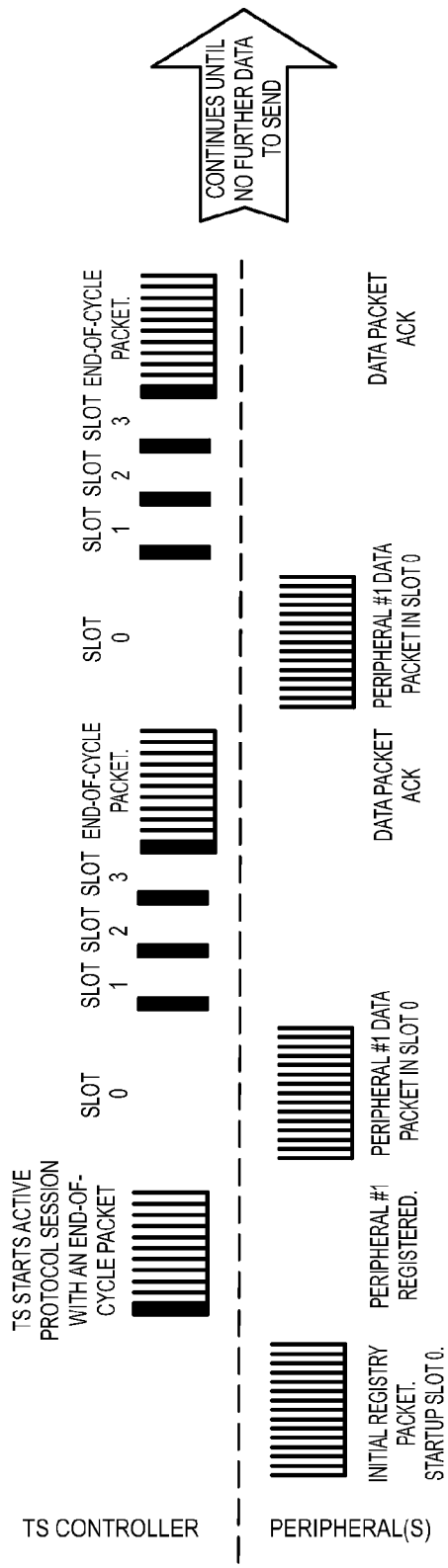
FIG. 3 illustrates, in graphical form, the sequential exchange of data packets between the TS Controller and a single peripheral transferring multiple packets of data.
Figure 4:
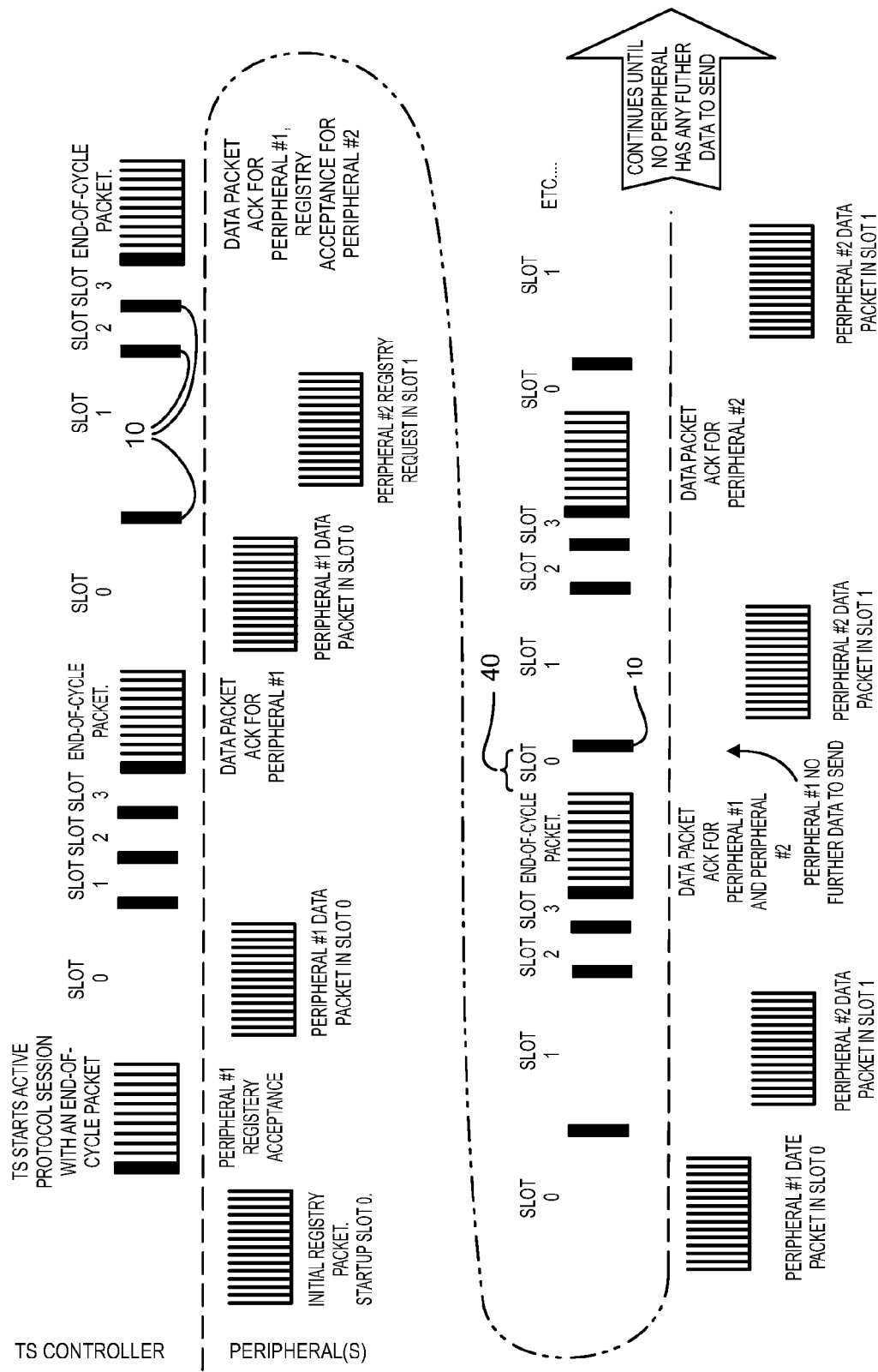
FIG. 4 illustrates, in graphical form, the sequential exchange of data packets between the TS Controller and multiple devices registering and performing simultaneous (interleaved) data transfer.

Once a peripheral device is registered and accepted by the TS Controller, the peripheral device may now transmit and receive data, as illustrated in FIGS. 2-4, by means of a data packets, examples of which are illustrated in FIG. 10. Transmission of the data packets is performed using the assigned time slot and may include the tag number. As a general rule, the time slot remains assigned to the peripheral for only as long as necessary to complete one contiguous data transfer operation. The registration may thus expire and the time slot be automatically de-allocated upon the occurrence of the first protocol cycle during which the peripheral does not transmit a data packet in the assigned time slot. Provision may be made, however, for peripherals which require a rapid reporting rate to request persistent registration, as described in greater detail hereinafter.

The tag number provided in connection with registration of a peripheral device and assignment of a time slot may be used in several ways, depending upon the application. In cases where one peripheral is assigned to one time slot the tag number may optionally be embedded within the data transferred and used to identify a communication session, e.g., each completed cycle of events in which a peripheral registers with the TS controller, a data transfer occurs, and the time slot allocation lapses. In this case, since each individual communication session may be provided with its own unique tag number, the TS Controller can use the tag number to detect abnormal situations in the communication link. For example, under error conditions, it may be possible for a peripheral device to believe that it still has a valid session in place while the TS Controller has in fact already cancelled the prior registration and assignment of the time slot. In this example case, the TS Controller can detect the tag number in a transmission from the peripheral device, which tag number has been noted as being expired by the TS Controller—as part of the deregistration process, and take steps, e.g., issue a "NACK, slot not registered" or a "backoff" message to the peripheral as may be seen in the "Cycle Completion" packet illustrated by way of example in FIG. 6, to cause the peripheral to stop transmitting data and initiate a new peripheral registry request.

In other applications where multiple, identical peripheral devices are in use, for example game controllers, classroom response units, or the like, the tag number may be used to uniquely distinguish individual peripheral devices. The tag number provided in connection with the assignment may also be useful in the case where a time slot is being shared by several peripheral devices on a polled basis under control of the TS Controller. In this case, the tag number can be used by the TS Controller to sequence transmissions by the peripheral devices. By way of example, each successive polled slot could have the polled tag number incremented by 1 as described in footnote 1 to the "Cycle Completion" packet definition illustrated in FIG. 6.

Once registered and accepted, a peripheral device may transfer data to the TS controller in its assigned time slot using one of several possible packet formats, examples of which are illustrated in FIG. 10. As can be seen, both long packets (e.g., FIGS. 10*a* and 10*b*) and short packets (e.g., FIG. 10*c*) may be supported. The TS controller may differentiate between the two packet sizes by simply monitoring the number of bits received. Different packet layouts may also be supported, as illustrated by the two exemplary long packets illustrated in FIGS. 10*a* and 10*b*. The packet format illustrated in FIG. 10*a* may be suitable, for example, for use by general purpose human interface peripheral devices and for the initial "Peripheral Registry Request" packet, while the format illustrated in FIG. 10b may be suitable, for example, for applications where maximum data transfer payload is required. Since these packets cannot be differentiated by length, provision may be made in the packet contents for a field (e.g., bits 1-3 and 1-4, or P0,P1 with reference to FIG. 7) to indicate to the receiving TS Controller which type the packet is being transmitted.

To maintain slot synchronization, the TS Controller may transmit marker pulses 10 to indicate the end of each assigned time slot interval, as illustrated in FIGS. 2-4. Variable timing for a time slot may be achieved by the TS Controller monitoring each assigned time slot for activity. If no activity occurs within a specified period after the start of an assigned time slot (that period being smaller than the time required to transmit a complete data packet), the TS Controller may be programmed to assume that the peripheral which is currently assigned that time slot has nothing to transmit and, thereby, cause the issuance of an end of time slot marker pulse. An example of this can be seen at 40 in FIG. 4. If the transmission of data is detected, however, the TS Controller may be programmed to issue the marker pulse 10 only after the data packet is completed and transmission from the peripheral ends. It can thus be seen that variable length data packets are also possible using this scheme. Similar logic may also be used in the case of unassigned time slots, where the TS Controller first monitors for any "Peripheral Registry Request" packet transmissions before issuing an end of slot marker pulse 10.

In the case where the communications link is currently inactive, e.g., in the case of start-up or where all time slots are empty and no registrations are currently indicated as being active in the TS Controller, the TS Controller may be optionally programmed to shut down and switch to a listen only mode. In such a case, a peripheral device that wishes to register and which detects no transmission activity on the communication link, may issue an asynchronous "Peripheral Registry" request packet to wake the IS Controller. In response, the TS Controller should start the protocol cycling in the manner described previously.

As noted previously, provision may also be made to allow peripheral devices which require a rapid reporting rate to request persistent registration with the TS Controller. Generally, persistent registration allows for the reduction of protocol latencies during periods of continuous peripheral activity in which the reporting rate would be low enough to require registration prior to each data report. By specifying persistent registration, a peripheral device can maintain its slot allocation between key repeats, rapid keying, etc.

When a peripheral device specifies persistent registration, the time slot allocation assigned to that peripheral device may remain active for a predetermined number of empty protocol cycles, e.g., up to thirteen (13), following a protocol cycle in which a packet was successfully transmitted in the allocated time slot. Persistent registration would be utilized, for example, when the default behavior for non-persistent slot allocation is set to cause the TS Controller to de-allocate a slot following a single empty protocol cycle.

To ensure the receipt of a new packet transmitted by the peripheral device within the exemplary 13 protocol cycles of a previous packet transmission by that peripheral device, the peripheral device should listen for a "Cycle Completion" packet and confirm that its previous time slot is still reserved by the TS Controller under persistent registration (e.g., as indicated by the tag value). If the TS Controller has persisted the registration, the peripheral device can simply send its data packet in the appropriate time slot. Otherwise the peripheral device should have to re-register with the TS Controller as usual.

Similarly, whenever the peripheral device goes to sleep and looses track of the time slot, the peripheral device should be programmed to forget its persistent registration, i.e., the peripheral would simply have to register with the TS Controller as usual. However, to avoid time slot exhaustion during rapid keying, a peripheral device should not go to sleep until it has been inactive long enough that its persistent registration tag would have expired by the time it awoke from a new user event and tried to establish a new session. To avoid time slot exhaustion during a marginal IR Link, the allocation of a time slot to persistent registration may not be actually confirmed until a data packet is received in the allocated slot from the registering peripheral. Reception of a data packet in this manner provides confirmation that the peripheral successfully received the "Cycle Completion" packet granting the persistent registration of the time slot.

When the TS controller wishes to transmit outbound data to one or more peripheral devices, this may be accomplished by first indicating in an "End-of-Cycle" packet which slot(s) in the forthcoming protocol cycle will contain outbound data packets from the TS controller, and which device(s) they are intended for. More specifically, with reference to FIG. 6 and Table 1, four of the possible slot status S(n)0 through S(n)3 values (8 through 11) may be used for this purpose and assigned the following significance: 8=broadcast (i.e., intended for all devices capable of receiving the data), 9=the device currently registered in the time slot one ahead of this one, 10=the device currently registered in the time slot two ahead of this one, and 11=the device currently registered in the time slot three ahead of this one. For these purposes, it will be appreciated that "ahead" in this context implies a circular reference, i.e., wrapping around from the last slot to the first slot, e.g. a value of "2" in the slot three status field S(3)0 through S(3)3 indicates that the outbound data will be located in slot one. FIG. 11 illustrates by way of example the format of such an outbound data packet from the TS controller. It will be noted that the TS controller may request that successful receipt of the data be acknowledged by the target peripheral by setting, for example, the value of bit 1-2 "AR" (e.g., acknowledgement required) to "1." If so requested, receipt of the data may be acknowledged by the peripheral device within the next inbound packet from it to the TS controller using, for example, the appropriate A1, A2 or A3 bit locations shown in FIG. 8, 9 or 10a. In a similar manner to that described before, the A1 through A3 bits relate to the outbound transmission that was located circularly 1, 2 or 3 slots ahead of the current slot.

During polled operation, the TS controller may poll a single peripheral device in each protocol cycle by setting the status of a single time slot in the "End-of Cycle" packet to "Polled Inbound" and placing the Tag number of the peripheral device being polled in the tag value Field. The device assigned that Tag number may then respond with a data packet in the indicated time slot of the upcoming cycle. In an alternative embodiment which may be used when more rapid polling of multiple peripheral devices in desirable, the TS controller may set the status of multiple time slots to "Polled Inbound," in which case the value in the Tag number field represents the peripheral device which is to respond in the first assigned time slot. The subsequent time slots would then be used, by implication, for responses from the next sequentially Tag numbered peripheral devices. By way of example, if three of the four slots had status "Polled Inbound" and the Tag value was "5," this would imply that the peripheral assigned Tag "5" was to respond in the first slot, the peripheral assigned Tag "6" was to respond in the second slot, and the peripheral assigned Tag "7" was to respond in the third slot. A subsequent protocol cycle might then continue inbound polling from the peripheral device assigned Tag "8" and so on. In this manner, multiple devices may be polled in each protocol cycle under the supervision of the TS controller.

While various concepts have been described in detail, it will be appreciated by those skilled in the art that various modifications and alternatives to those concepts could be developed in light of the overall teachings of the disclosure. For example, it should be appreciated that the concepts described herein might also be applicable to other bi-directional wireless protocols and encoding schemes and, therefore, need not be limited to IR communication protocols. As such, the particular concepts disclosed are meant to be illustrative only and not limiting as to the scope of the invention which is to be given the full breadth of the appended claims and any equivalents thereof.

What is claimed is:

1. A method for receiving data at a consumer electronic device from a plurality of peripheral devices, comprising:
    (a) broadcasting from the consumer electronic device a message which includes a first data field having data that indicates a time slot, a second data field having data that indicates a numerical identifier of a single peripheral device, and a third data field having data that indicates a polled inbound status;
    and, in response to the message having the polled inbound status;
    (b) causing the peripheral device assigned the numerical identifier to transmit data to the consumer electronic device during the time slot;
    (c) causing the peripheral device assigned the next highest numerical identifier to automatically transmit data to the consumer electronic device by implication during the next sequentially higher time slot; and
    (d) repeating step (c) until each of the plurality of peripheral devices has transmitted data to the consumer electronic device or no further time slots are available in which data may be transmitted.

2. A method for receiving data at a consumer electronic device from a plurality of peripheral devices, comprising:
    (a) broadcasting from the consumer electronic device a message which includes a first data field having data that indicates a time slot, a second data field having data that indicates a numerical identifier of a single peripheral device, and a third data field having data that indicates a polled inbound status;
    and, in response to the message having the polled inbound status;
    (b) causing the peripheral device assigned the numerical identifier to transmit data to the consumer electronic device during the time slot;
    (c) causing the peripheral device assigned the next sequentially highest numerical identifier to automatically transmit data to the consumer electronic device by implication during the next sequentially higher time slot; and
    (d) repeating step (c) until each of the plurality of peripheral devices has transmitted data to the consumer electronic device or no further time slots are available in which data may be transmitted.

* * * * *